Aug. 22, 1961     A. V. L. C. DEBRIE     2,996,951
GUIDE MEANS FOR CINEMATOGRAPHIC FILMS
Filed Jan. 13, 1958     2 Sheets-Sheet 1
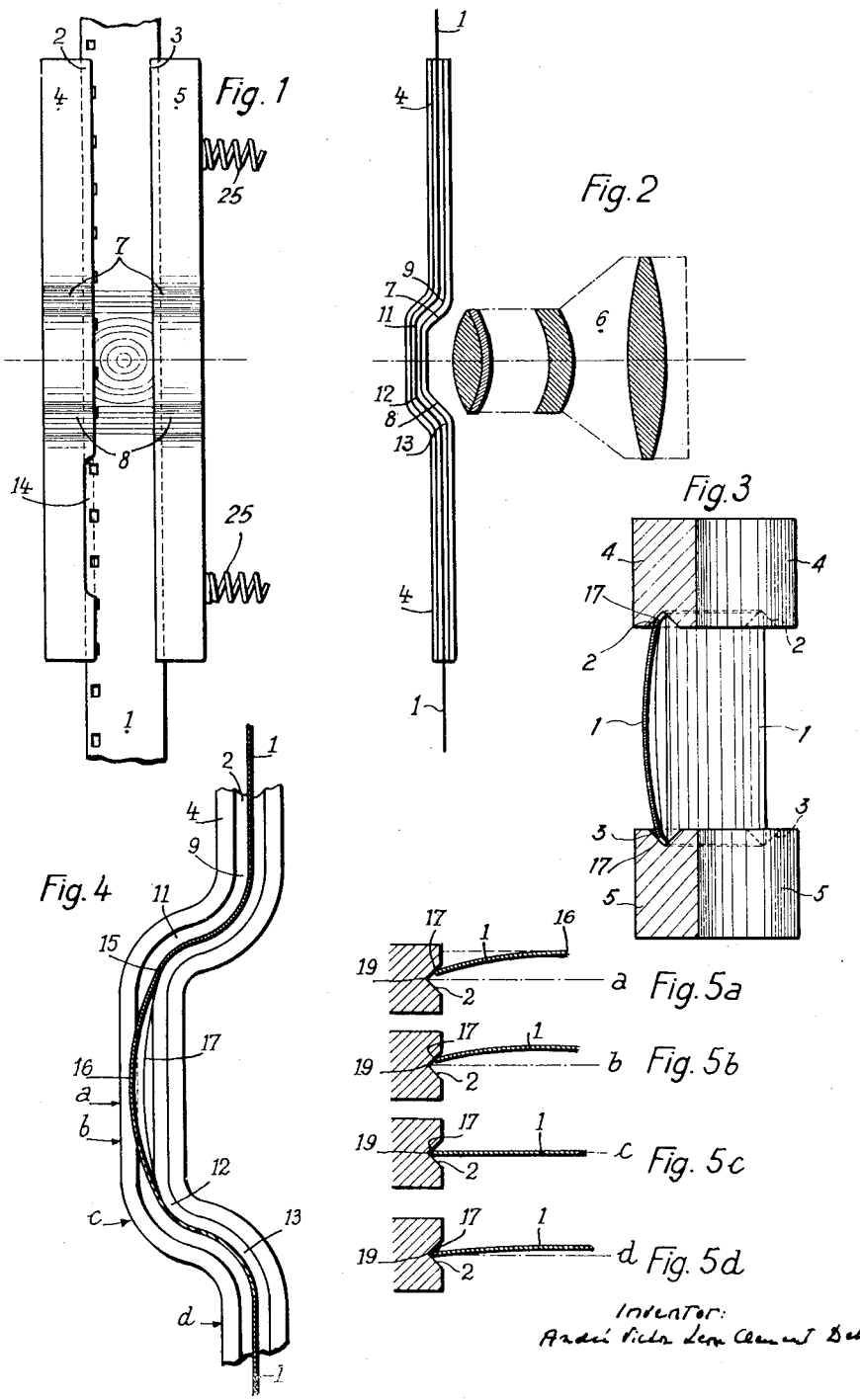

Fig. 9
Fig. 11
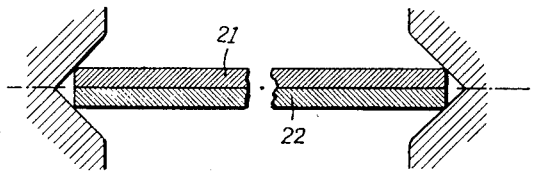
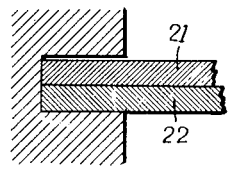
Fig. 10
Fig. 12
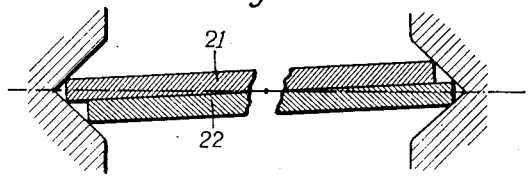
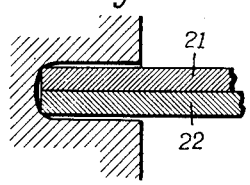
Fig. 13
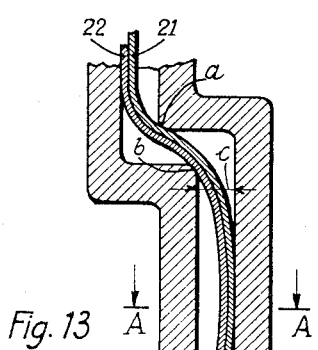
Fig. 6
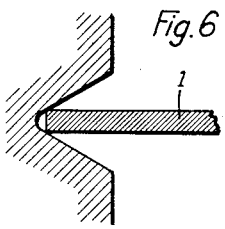
Fig. 7
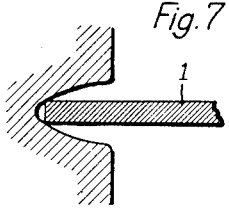
Fig. 8
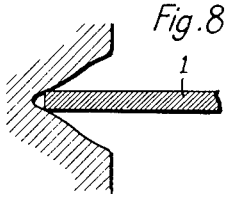
Fig. 14

United States Patent Office 2,996,951
Patented Aug. 22, 1961

2,996,951
GUIDE MEANS FOR CINEMATOGRAPHIC FILMS
Andre Victor Leon Clement Debrié, 111 Rue Saint-Maun, Paris, France
Filed Jan. 13, 1958, Ser. No. 708,456
Claims priority, application France Jan. 16, 1957
7 Claims. (Cl. 88—17)

In cinematograph cameras or projectors film passages of various types are used to guide the film into position behind the objective.

In most of these arrangements, one attempts to realize, at the position where images are formed or projected, a local absolute flatness of the film.

To this end passages with pressure members are employed which, if they fulfill their object sufficiently well, have the grave inconvenience of rubbing on the film and soon scratching it.

To avoid this grave inconvenience, it has been proposed to use passages in which the film is guided by its edges which engage in V-grooves. With one V-groove pressed suitably towards another V-groove, one obtains, by using curved grooves, generally circular and without variation of the direction of the longitudinal curvature of the film at the approach to the image gate, a straightening of the transverse curvature which the film naturally takes and there is the possibility of pressing the film laterally into the slideways which allows good guiding for a curl of film. The results for circular sound readers are excellent but the curved form of such a passage before and after the film gate even if in this passage a cancelling of the curvature is practical, make such a passage too cumbersome to be easily adapted to films, cameras, projectors and printers.

On the other hand, the use of straight passages with lateral grooves has not been possible, the lateral pressure necessary for centering the film, exaggerating still more the transverse curvature of the film.

While it is generally desirable to avoid transverse curvature of the film, it is sometimes desirable, in apparatus using an objective that the surface of the film in the image window should not be plane but curved concavely, with a surface of double curvature at each point substantially coinciding with the surface of curvature of the field of the objective used.

On the other hand in contact printers a similar curvature in the image window is not prejudicial in practice to the printing and allows an exact application of the film to be printed against the virgin film.

In the two cases, it may be desirable to restrain the friction of the edges of the film to a limited length before and after the image window.

The present invention permits the solution of problems of proper guiding and of forming a controlled curved surface adapted substantially to the curvature of the field of the objective or of assuring contact of the two films in contact printers.

The passage according to the invention is formed essentially by a plate in which the image gate is formed and which carries two parts in which are formed two longitudinal film guiding grooves oppositely disposed, constantly symmetric in relation to a median plane parallel to the plane of symmetry of the image gate and in the sense of the displacement of the film in the latter, the first part being fixed on the plate and the second being able to slide perpendicularly to the said plane of symmetry and constantly urged by elastic means towards the first in a manner to press on the edges of the film which engages in the longitudinal grooves, the assembly being characterised in that the grooves before and after the image gate are rectilinear and parallel to one another and to the general plane of the image gate and are joined to parts of the grooves corresponding to this image gate by parts in which the groove presents a succession of at least two curves of small radii of which the curvatures in planes parallel to the plane of symmetry are in opposite directions which ensures that the film is deviated and then brought back into the general direction of the passage by these multiple curves.

These curves of small radius in relation to the dimension of the passage, give to the film cylindrical shapes of which the generatrixes perpendicular to its edges have lengths equal to the width of said film. These oppositely curved cylindrical portions will resist deformation of the film in transverse direction and these portions will limit approach of the slideways toward each other.

As a result, the film is perfectly centered and guided in the grooves. The passage, generally rectilinear, has no longer the disadvantages of straight passages with pressure members or V grooves and having however all the guiding advantages of curved passages with V slides without having the inconveniences.

In conveniently choosing the radii of curvatures of the parts of the grooves preceding and following the gate, the film portion extending over the gate will assume an appropriate curvature in the plane of symmetry of the film.

The sections of these grooves, in the case of guiding of a single film, are of V shape in the general sense of the term, that is triangular sections open at their base, with rectilinear or non rectilinear sides, joined at the apex in a point or at least by a curve of which the chord is less than the thickness of the film.

In the case of the simultaneously guiding of two films, for example in contact printers, the section of the grooves may be rectangular with a flat bottom, or may be a U with rounded bottom with the sides sufficiently spaced, but not necessarily parallel, but in all forms, the width of the grooves at the bottom of the U is such that in practice it is this bottom which bears transversely upon the sections of the lateral edges of the films and not the sides.

While the grooves may generally be of substantially constant depth and with a constant profile in the parallel faces of the lateral parts of the passage, they can also be of varied profile and depth joined successively along the length of the grooves. These variations of profile or of depth in the passage through the gate permit adjustment of the curvatures of the surface of the film to the curvature of the field of the objective with a view to a correction at least approaching the effects of the latter.

For a better understanding of the invention several embodiments of realization of the latter, chosen by way of non-limitative examples are shown in the attached drawings in which:

FIG. 1 represents in elevation, reduced to the parts relevant to the present application, a guide passage for a single film for example for a projector.

FIG. 2 shows the same passage in sectional elevation on a longitudinal plane passing through the axis of the objective.

FIG. 3 is a transverse section of the same passage on a plane normal to the direction of advancement of the film and passing through the axis of the objective.

FIGS. 4 and 5a, 5b, 5c and 5d show the forms that the guides according to the invention give to the film in its passage between the zones of alternate curvature. FIG. 4 is an enlarged schematic section along the axis of the film in the gate of the projector. FIGS. 5a, 5b, 5c and 5d show schematic part sections of the film in the zones marked a, b, c, d, on FIG. 4.

FIGS. 6, 7 and 8 show some examples of profiles of sections which can be used instead of a true V.

FIGS. 9 and 10 show the position taken by two superposed films guided in V grooves.

FIGS. 11 and 12 are examples of sections of grooves for guiding two films superposed in a passage according to the invention.

FIGS. 13 and 14 represent schematically in lateral section on the line B—B and in transverse section on the line A—A respectively, a portion of a guiding passage with grooves of rectangular section for guiding two superposed films in the region of the gate of a contact printer.

In FIGURES 1, 2 and 3, the film slides in the grooves 2 and 3 having a V profile formed in opposite faces of the guide members 4 and 5 of the passage.

According to a known method, one of the guide members of the passage (for example 5) is pressed towards the other guide member 4 by springs 25 all being suitably guided to remain opposite 4. At 6 is indicated schematically the objective of the projector.

The V grooves in guide members 4 and 5 are in the case shown straight up to the approaches 7 and 8 of the projection gate.

At 7, the groove is diverted by a first band 9 towards the rear of the projector, then returned by an opposed curve 11 in a direction normal to the axis and parallel to its original direction before 9. As soon as it has passed the projection gate, a curve 12 returns the film 1 to the front and an opposite curve 13 again gives to the passage its original direction 4, 4 and 5, 5.

In the rectilinear part of guide member 4, after the passage behind the objective, a hollowed out portion 14 is arranged for the passage of the claws of the driving drum for the film, for example.

It will be seen that in the assembly, the path of the film is substantially rectilinear, a deviation towards the rear for example followed by a return into the original plane or into a parallel plane taking place at the height of the projection gate by the action of curves alternatively grouped in pairs upstream and downstream of the gate in the direction of movement of the film.

In FIG. 4 there is shown the film 1 guided in the V grooves 2 of the central part (alone shown) of the guide member 4.

The groove 2 is bent towards the left at 9, then oppositely bent towards the bottom at 11, remains straight up to the curve 12 which brings it towards the right and which is followed by the curve 13 which brings the groove 2 into its original direction.

The apparatus then functions as follows:

The film 1, of which the edge is guided by groove 2, is formed, on account of curves 9 and 11 into a cylinder with generatrixes perpendicular to its direction of displacement. These cylindrical parts 9 and 11 of the film, as well as the parallel cylindrical parts formed by the passage at 12 and 13, are very rigid and the film, pressing its edges firmly into the bottom of the grooves 2 and 3, receives without flexure the pressure of the springs which urges guide member 5 towards guide member 4 and limits their approach, determining the width of the passage which will no longer press the film in the other regions and will permit the guiding of the film without increasing by its pressure, the transverse deformation which it would otherwise cause.

Up to the point 15 and beyond the point 18 between the curves 9, 11, 12 and 13, the film is rigidly cylindrical with generatrices perpendicular to the plane of FIG. 4. Its edge 17 will follow exactly the bottom 19 of the V of groove 2.

Because of the constraints due to the curvature of small radius which is imposed on it at 11 and 12, the median longitudinal axis of the film follows an arc 15, 16 and 18, tending to give to the film 1 a very easy curvature concave toward the right, between the two rectilinear generatrices 15 and 18. If the groove 2 did not exist in this region 15, 18, the edge 17 would tend to take the same curvature 15, 16, 18 as the median axes of the film and to take the position indicated in dotted lines on FIGURE 5a.

The presence of the V-groove 2 fixes the edge 17 as shown in FIG. 5a. It results that at 16 on the axis of the projection gate, the film, curved longitudinally according to 15, 16, 18, is curved transversely at 17, 16 and, symmetrically on the side near groove 3.

After this middle point 16 of maximum double curvature, we see in FIG. 5b that the curvature alters and flattens itself as shown in the schematic half sections FIGS. 5b and 5c. In FIG. 5b the bow diminishes and in FIG. 5c, the transverse curvature is nil. In FIG. 5d, at a zone no longer concerned with projection, the film, not pressed by the guides after the end of the driving, due to the curves of the grooves, regains freely its section of equilibrium of usually slightly concave on the gelatined side.

The same phenomena occur symmetrically upstream from the center of the gate.

It will be seen then that the surface of the film to be projected is itself put, in the projection gate, in a form generally concave towards the objective.

To perfect the variation of transverse curvature and to harmonize it with the median longitudinal curvature in order to approximate in front of the objective a substantially spherical surface, one can shape the V grooves, at least in their parts at each side of the projection gate and between the parts with multiple curvatures, with non-rectilinear profiles or a variable depth or a combination of these arrangements so as to vary the points of contact 17 to achieve the desired result. FIG. 6 shows a V groove profile having rectilinear side face, whereas FIGS. 7 and 8 show V grooves with curved side faces. The profile of FIG. 7 will produce at the location 16 of FIG. 4 a curvature transverse to the elongation of the film greater than is obtained from the profile of FIG. 6, whereas the profile of FIG. 8 will produce a smaller transverse curvature than that produced by the profile of FIG. 6.

The dishing of the part of the film to be projected is due to the shapes given to the guide grooves of the passage in the present invention and is even independent, to a large degree at least, of the transverse concavity which the emulsion face of the film always tends to take. One forms in effect a concave cup in the same sense by reason of the passage whether the film is passed with the sensitive face in front or behind. This concavity is conveniently controlled so as to be, when used with objectives of great luminosity favourable to the exactness of the image registered or projected.

The same properties of a passage according to the invention can be advantageously used in cameras for taking views. One has the advantage in all cases of a great gentleness of guiding, the film being squeezed laterally only locally upstream and downstream of the gate. This gentleness of handling saves fatigue of the perforations. The film, not being rubbed on its faces, remains free from scratches.

In certain applications, for example in contact printers, it is necessary to assure the guiding of two films, superposed and in contact.

In this case, V-grooves present some inconveniences due to the fact that there are an infinite number of possible distributions in the V section of the position of the two films 21 and 22, which may engage the faces of the V sometimes by a single edge of each film and sometimes by two edges of one of them (FIGURES 9 and 10).

Apart from the imprecision of positioning and its possible wavering along the guided length, a cause of premature wear is introduced.

One is then brought to use, for the simultaneous guidance of two films, lateral pressing grooves of which only the bottom is in contact with the edge of the films and having a section with parallel rectangular edges (FIG. 11) or of U shape with the bottom very slightly rounded (FIG. 12).

The opening of such sections between the parallel parts should, theoretically at least, have at the entrance to the gate, a width corresponding to the sum of the thickness of the films (FIGURES 11 and 12) but this condition can not be met without play because of the irregular thickness of films. In the case of a contact printer the imprecision of the positioning of the surface of films 21 and 22 in the image gate not being critical provided that their contact is assured, even relatively large, play between the films and the parallel faces is not important. The formation of the parts forming struts on each side is assured by the multiple curvatures that the films 21 and 22 are obliged to take by pressing at $a$ and $b$ as is shown in the scheme of FIGURE 13. In FIGURES 13 and 14, the interval $c$ is exaggerated as well as the bending at right angles between $a$ and $b$ corresponding to two alternate curves. The contact between the films 21 and 22 is ensured by the tension and in particular by the curvature imposed on them by the engagement at these points $a$ and $b$ of the opposite sides of the grooves of the edges of their non-emulsioned surfaces before and after the image gate.

What I claim is:

1. Film guide means comprising, in combination, a pair of guide members arranged substantially parallel to and spaced from each other, at least one of said guide members being adapted to be yieldably pressed toward the other of said guide members, each of said guide members being formed at a side face thereof facing the other of said guide members with a longitudinal groove extending through the whole length thereof and adapted to receive the edge of a film to be guided between said guide members, each of said grooves having a pair of end portions located substantially in one plane and a central portion displaced relative to said plane and joined to said end portions respectively by a pair of connecting portions having each succesively arranged oppositely curved portions of small radius of curvature, said grooves in said pair of guide members being aligned with each other whereby a film guided by said film guide means will assume in the central portion thereof a substantially spherical shape.

2. Film guide means comprising, in combination, a pair of guide members arranged substantially parallel to and spaced from each other, at least one of said guide members being adapted to be yieldably pressed toward the other of said guide members, each of said guide members being formed at a side face thereof facing the other of said guide members with a longitudinal groove of V-shaped cross-section opening toward the corresponding groove in the other of said guide members and extending through the whole length thereof, said groove being adapted to receive the edge of a film to be guided between said guide members, each of said grooves having a pair of end portions located substantially in one plane and a central portion displaced relative to said plane and joined to said end portions respectively by a pair of connecting portions having each successively arranged oppositely curved portions of small radius of curvature, said grooves in said pair of guide members being aligned with each other whereby a film guided by said film guide means will assume in the central portion thereof a substantially spherical shape.

3. Film guide means comprising, in combination, a pair of guide members arranged substantially parallel to and spaced from each other, at least one of said guide members being adapted to be yieldably pressed toward the other of said guide members, each of said guide members being formed at a side face thereof facing the other of said guide members with a longitudinal groove of V-shaped cross-section opening toward the corresponding groove in the other of said guide members and extending through the whole length thereof, said groove being adapted to receive the edge of a film to be guided between said guide members, each of said grooves having a pair of end portions located substantially in one plane and a central portion displaced relative to said plane and joined to said end portions respectively by a pair of connecting portions having each successively arranged oppositely curved portions of small radius of curvature, said V-shaped grooves having curved side faces and the curvature of the side faces at said central portion being different from the curvature of said side faces at said end portions of said groove, said grooves in said pair of guide members being aligned with each other whereby a film guided by said film guide means will assume in the central portion thereof a substantially spherical shape.

4. Film guide means comprising, in combination, a pair of guide members arranged substantially parallel to and spaced from each other, at least one of said guide members being adapted to be yieldably pressed toward the other of said guide members, each of said guide members being formed at a side face thereof facing the other of said guide members with a longitudinal groove extending through the whole length thereof and adapted to receive the edge of a film to be guided between said guide members, each of said grooves having a pair of end portions located substantially in one plane and a central portion located in a plane substantially parallel to said plane and joined to said end portions respectively by a pair of connecting portions having each successively arranged oppositely curved portions of small radius of curvature, said grooves in said pair of guide members being aligned with each other whereby a film guided by said film guide means will assume in the central portion thereof a substantially spherical shape.

5. Film guide means comprising, in combination, a pair of guide members arranged substantially parallel to and spaced from each other, at least one of said guide members being adapted to be yieldably pressed toward the other of said guide members, each of said guide members being formed at a side face thereof facing the other of said guide members with a longitudinal groove of U-shaped cross-section opening toward the corresponding groove in the other of said guide members and extending through the whole length thereof, said groove being adapted to receive the edges of two films superimposed to each other to be guided between said guide members, each of said grooves having a pair of end portions located substantially in one plane and a central portion displaced relative to said plane and joined to said end portions respectively by a pair of connecting portions having each successively arranged oppositely curved portions of small radius of curvature, said grooves in said pair of guide members being aligned with each other whereby a film guided by said film guide means will assume in the central portion thereof a substantially spherical shape.

6. Film guide means comprising, in combination, a plate formed with an image gate; a first elongated guide member fixedly mounted on said plate on one side of said gate; a second elongated guide member mounted on said plate on the other side of said gate movable toward and away from said first elongated guide member in parallel relationship thereto; spring means operatively connected to said second elongated guide member and tending to move said second guide member toward said first guide member, each of said guide members being formed at a side face thereof facing the other of said guide members with a longitudinal groove extending through the whole length thereof and adapted to receive the edge of a film to be guided between said guide members, each of said grooves having a pair of end portions located substantially in one plane parallel to said plate and respectively located upstream and downstream of said gate and a central portion in the region of said gate displaced relative to said plane and joined to said end portions by a pair of connecting portions having each successively arranged oppositely curved portions of small radius of curvature whereby a film guided by said film guide means will assume in the central portion thereof a substantially spherical shape.

7. Film guide means for guiding a film in front of an objective comprising, in combination, a pair of guide members arranged substantially parallel and spaced from each other, at least one of said guide members being adapted to be yieldably pressed toward the other of said guide members, each of said guide members being formed at a side face thereof facing the other of said guide members with a longitudinal groove extending through the whole length thereof and adapted to receive the edge of a film to be guided between said guide members, said grooves in said pair of guide members being aligned with each other, each of said grooves having a pair of end portions adapted to extend to opposite sides of the objective and located substantially in a plane normal to the axis of the objective and a central portion in front of the objective and displaced relative to said plane and joined to said end portions respectively by a pair of connecting portions having each successively arranged oppositely curved portions of small radius of curvature, whereby the film portions passing through said connecting portions will form portions of cylinders which will unyieldingly resist the transverse pressure of the one guide member toward the other guide member to relieve thereby the other film portions of said transverse pressure, said central portion having a curvature smaller than the curvature of said connecting portions so that the edges of the film portion located in the grooves of said central portion will be held back relative to the curvature imparted to the film by the connecting portions adjacent said central portion so that the film in the central portion will assume a substantially spherical shape without contacting said objective.

References Cited in the file of this patent

UNITED STATES PATENTS

| | | |
|---|---|---|
| 1,256,613 | Terwilliger | Feb. 19, 1918 |
| 1,888,527 | Edouart | Nov. 22, 1932 |
| 2,142,606 | Debrie | Jan. 3, 1939 |
| 2,598,364 | D'Avitaya | May 27, 1952 |

FOREIGN PATENTS

| | | |
|---|---|---|
| 202,315 | Australia | June 7, 1956 |
| 228,671 | Switzerland | Dec. 1, 1943 |
| 673,065 | Great Britain | June 4, 1952 |
| 940,348 | France | May 18, 1948 |